US010944988B2

(12) United States Patent
Shi et al.

(10) Patent No.: US 10,944,988 B2
(45) Date of Patent: Mar. 9, 2021

(54) METHOD AND APPARATUS FOR UNIFIED ERROR CONCEALMENT FRAMEWORK

(71) Applicant: QUALCOMM Incorporated, San Diego, CA (US)

(72) Inventors: Fang Shi, San Diego, CA (US); Seyfullah Halit Oguz, San Diego, CA (US); Sumeet Singh Sethi, San Jose, CA (US); Vijayalakshmi R. Raveendran, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 587 days.

(21) Appl. No.: 15/660,264

(22) Filed: Jul. 26, 2017

(65) Prior Publication Data

US 2017/0324980 A1    Nov. 9, 2017

Related U.S. Application Data

(62) Division of application No. 11/433,135, filed on May 11, 2006, now Pat. No. 9,749,655.

(Continued)

(51) Int. Cl.
*H04N 19/577* (2014.01)
*H04N 19/159* (2014.01)
(Continued)

(52) U.S. Cl.
CPC ......... *H04N 19/577* (2014.11); *H04N 19/102* (2014.11); *H04N 19/132* (2014.11); *H04N 19/142* (2014.11); *H04N 19/157* (2014.11); *H04N 19/159* (2014.11); *H04N 19/166* (2014.11); *H04N 19/172* (2014.11); *H04N 19/174* (2014.11); *H04N 19/176* (2014.11); *H04N 19/177* (2014.11); *H04N 19/587* (2014.11); *H04N 19/61* (2014.11); *H04N 19/895* (2014.11)

(58) Field of Classification Search
CPC ...................................................... H04N 19/67
See application file for complete search history.

(56) References Cited

U.S. PATENT DOCUMENTS 5,524,194 A    6/1996 Chida et al.
5,742,599 A    4/1998 Lin et al.
(Continued)

FOREIGN PATENT DOCUMENTS

| JP | 10174094 | 6/1998 |
|---|---|---|
| JP | 2005311603 | 11/2005 |
| WO | WO-2004064396 | 7/2004 |

OTHER PUBLICATIONS

International Search Report and Written Opinion—PCT/US2006/018596, International Search Authority—European Patent Office—dated Mar. 4, 2008.

*Primary Examiner* — Young Lee
(74) *Attorney, Agent, or Firm* — Norton Rose Fulbright US LLP

(57) ABSTRACT

A method and apparatus of processing multimedia data that includes a first section received in error are disclosed. Error distribution information corresponding to the first section may be obtained. One of a plurality of error recovery schemes may be selected based on the error distribution information for the first section. The selection may be based at least on whether a channel switch is detected. The first section may be processed based on the selected error recovery scheme.

20 Claims, 6 Drawing Sheets

Related U.S. Application Data

(60) Provisional application No. 60/681,195, filed on May 13, 2005, provisional application No. 60/680,213, filed on May 11, 2005.

(51) Int. Cl.
*H04N 19/176* (2014.01)
*H04N 19/172* (2014.01)
*H04N 19/102* (2014.01)
*H04N 19/61* (2014.01)
*H04N 19/132* (2014.01)
*H04N 19/142* (2014.01)
*H04N 19/157* (2014.01)
*H04N 19/166* (2014.01)
*H04N 19/177* (2014.01)
*H04N 19/174* (2014.01)
*H04N 19/587* (2014.01)
*H04N 19/895* (2014.01)

(56) References Cited

U.S. PATENT DOCUMENTS

| | | |
|---|---|---|
| 6,636,565 B1 | 10/2003 | Kim |
| 6,747,961 B1 | 6/2004 | Ahmed et al. |
| 6,765,896 B1 | 7/2004 | Ahmed et al. |
| 7,103,669 B2 | 9/2006 | Apostolopoulos |
| 2005/0008240 A1 | 1/2005 | Banerji et al. |
| 2006/0262864 A1 | 11/2006 | Shi et al. |
| 2006/0282737 A1 | 12/2006 | Shi et al. |
| 2007/0074266 A1 | 3/2007 | Raveendran et al. |

| SLICE TYPE NO | SLICE TYPE TYPE REPRESENTED |
|---|---|
| 0 | P-SLICE IN A POTENTIALLY NON-UNIFORM ACCESS UNIT |
| 1 | B-SLICE IN A POTENTIALLY NON-UNIFORM ACCESS UNIT |
| 2 | I-SLICE IN A POTENTIALLY NON-UNIFORM ACCESS UNIT |
| 5 | P-SLICE IN A UNIFORM ACCESS UNIT |
| 6 | B-SLICE IN A UNIFORM ACCESS UNIT |
| 7 | I-SLICE IN A UNIFORM ACCESS UNIT |
| X | UNKNOWN TYPE OF SLICE IN A POTENTIALLY NON-UNIFORM ACCESS UNIT |

METHOD AND APPARATUS FOR UNIFIED ERROR CONCEALMENT FRAMEWORK

The present application for patent is a divisional application of, commonly assigned, U.S. application Ser. No. 11/433,135 entitled "METHOD AND APPARATUS FOR UNIFIED ERROR CONCEALMENT FRAMEWORK" filed on May 11, 2006. The present application for patent claims priority to U.S. application Ser. No. 11/433,135 entitled "METHOD AND APPARATUS FOR UNIFIED ERROR CONCEALMENT FRAMEWORK" filed on May 11, 2006, U.S. Provisional Application No. 60/680,213 entitled "A METHOD AND APPARATUS FOR UNIFIED ERROR CONCEALMENT FRAMEWORK" filed on May 11, 2005, and U.S. Provisional Application No. 60/681,195 entitled "A METHOD AND APPARATUS FOR UNIFIED ERROR CONCEALMENT FRAMEWORK" filed on May 13, 2005, all of which are assigned to the assignee hereof and hereby expressly incorporated by reference herein.

BACKGROUND

Field

This invention relates to methods and apparatus for encoding and decoding multimedia data such as video data or audio data with error management.

Background

Widespread use of the Internet and wireless communication has increased demand for multimedia services that stream media over the Internet and mobile/wireless channels. In Internet Protocol (IP) networks, video may be provided by a server and may be streamed by one or more wired or wireless clients. Wired connections include dial-up, integrated services digital network (ISDN), cable, digital subscriber line protocols (collectively referred to as xDSL), fiber, local area networks (LAN), wide area networks (WAN) and others. Electronic devices utilizing wireless communications include telephones (e.g., cell phones), personal data assistants (PDAs), hand-held and portable computers, satellite phones and others. In most, if not all of these applications, bandwidth requirements and/or restrictions necessitate that video processing utilize a source encoder incorporating video compression algorithms to analyze, quantify, process and represent video data to convey the maximum information by expending a "minimum" number of bits. Characteristics of such algorithms vary significantly which leads to large scale variations in their performance (such as objective/subjective quality, compression efficiency and bit rate). Characteristics of video processing using compressions algorithms may vary significantly based on content, which may lead to large scale variations in their performance (such as objective/subjective quality, compression efficiency and bit rate).

Wireless channels are prone to errors. A part of transmitted data is "erroneous" if this part of data is lost or corrupt. Because video compression inherently removes redundancy, the compressed data becomes critical. Any erroneous part of this data during transmission impacts reconstructed video quality at the decoder. The impact is aggravated if the erroneous data is part of the reference frame for motion compensated prediction, causing temporal error propagation.

To alleviate the impact on reconstructed video quality due to erroneously received bitstream data, the video decoder processes the received video data to improve video quality. This is referred to as error concealment. Error concealment schemes make use of the spatial and temporal correlation that exists in the video signal.

Currently, several error concealment schemes are available. Depending on the particular circumstances, one error concealment scheme may offer a better result than other error concealment schemes. Therefore, it is desirable to develop a unified error concealment framework that may dynamically choose from a plurality of error concealment schemes the one that is more suitable for a particular concealment task.

SUMMARY

In one aspect, a method of processing multimedia data comprises a first section received in error are disclosed. The method comprises obtaining error distribution information corresponding to the first section. The method further comprises applying one of a plurality of error recovery schemes to the first section of the multimedia data based on the error distribution information.

In another aspect, an apparatus for processing multimedia data comprising a first section received in error, comprises means for obtaining error distribution information corresponding to the first section; and means for applying one of a plurality of error recovery schemes to the first section of the multimedia data based on the error distribution information.

In a further aspect, an apparatus for processing multimedia data comprises a receiver configured to receive the multimedia data having a first section received in error; and an error concealer configured to apply one of a plurality of error recovery schemes to the first section of the multimedia data based on an error distribution information corresponding to the first section. The apparatus may further comprise an obtaining module configured to obtain the error distribution information corresponding to the first section. Alternatively, the error concealer may be further configured to obtain the error distribution information corresponding to the first section.

In the above aspects, the multimedia data may comprise a plurality of frames, each frame comprising a plurality of sections, and the error distribution information may be obtained by generating a map comprising locations of correctly decoded and erroneous sections. The multimedia data may comprise information generated from multiple layer protocols. One of the plurality of error recovery schemes may be selected based on the error distribution information for the first section and the first section may be processed based on the selected error recovery scheme. The selecting may be based at least on whether a first access unit comprising the first section is uniformly coded, based at least on whether a channel switch is detected, based at least on whether a new object is detected, and/or based at least on whether the first section comprises a uniformly coded slice or a non-uniformly coded slice.

Furthermore, it should be noted that a processor may be implemented to perform the method and/or functions of the apparatus as described. Similarly, a machine readable medium may be implemented, wherein the machine readable medium has instructions configured to perform the method and/or functions of the apparatus as described.

DETAILED DESCRIPTION

Figures 1, 7:
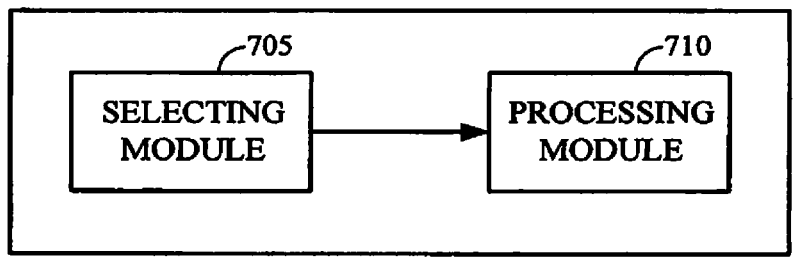
FIG. 1 illustrates an example list of possible types of slices in the incoming multimedia data stream.
FIG. 7 shows an example error concealer.

In the following description, specific details are given to provide a thorough understanding of the disclosed methods and apparatus. However, it will be understood by one of ordinary skill in the art that the disclosed methods and apparatus may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, a " " refers to. The term "storage medium" may represent one or more devices for storing data, including read only memory (ROM), random access memory (RAM), magnetic disk storage mediums, optical storage mediums, flash memory devices and/or other machine readable mediums for storing information. The term "machine readable medium" or "computer readable medium" includes, but is not limited to portable or fixed storage devices, optical storage devices, wireless channels and various other mediums capable of storing, containing or carrying instruction(s) and/or data.

Certain embodiments of a method of decoding a received multimedia data stream will be described below in detail. The multimedia data may be of various forms including, but not limited to, video, audio, graphics, text, and pictures. The data may be compressed video and audio as in the MPEG-x standards, compressed video as in the H.26x standards, compressed audio as in the MPEG-2 AAC, MPEG-4 AAC, MPEG-2 Audio Layer III (MP3), AMR and G.723 audio or voice compression standards, or any other type of digital data. The data stream may be received via a wired network such as telephone, cable, and fiber optic, or a wireless network. In the case of wireless, the network may comprise, for example, part of a code division multiple access (CDMA or CDMA2000) communication system or alternately, the system may be a frequency division multiple access (FDMA) system, an orthogonal frequency division multiple access (OFDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1×EV-DO or 1×EV-DO Gold Multicast) system, or in general any wireless communication system employing a combination of techniques.

In one example, a multimedia data stream is coded using a structure similar to that of H.261, MPEG-1 Part 2, MPEG-2 Part 2 (H.262), MPEG-4 Part 2, H.263, and H.264. The multimedia data stream may comprise one or more sequences of data. A sequence begins with a sequence header, includes one or more groups of pictures (GOPs), and ends with an end-of-sequence code. A GOP comprises one or more pictures or frames of which the first frame is an Intra-coded frame. An Intra-coded frame (I-picture or I-frame) refers to a frame that has no reference to any other frame.

A frame is a type of coding unit of a video sequence. Video data in a frame comprises three rectangular matrices representing luminance (Y) and two chrominance ($C_b$ and $C_r$) components. There are different types of frames depending on how a frame is coded, such as an intra-coded frame, a predicted frame, and a bidirectional predicted frame. The intra frame has been described above. A predicted frame (P-picture or P-frame) is a frame that is predicted with motion compensation from a reference frame by encoding the difference between the current frame and the reference frame. A P-frame may use either a forward or a backward frame, but not both, as reference frames. A bidirectional frame (B-picture or B-frame) refers to a frame that uses a forward or a backward or both frames as reference frames.

Both a P-frame and a B-frame are encoded by a coding technique called inter or predictive coding. Inter-coding encodes data in a frame by exploiting temporal redundancy between a region in a current frame and a best matching prediction region in a reference frame. The difference between the current region and the best matching reference prediction region is known as residual error (or prediction error). The relative location of the best matching prediction region in the reference frame may be encoded as a motion vector.

A frame can further be compressed by partitioning it as one or more slices. A slice may be a group of one or more macroblocks. A slice may be contiguous in raster-scan order or may correspond to an arbitrary subset of the frame data. A slice can be coded independently and/or can be decoded independently from the other slices in the same frame and other frames. Accordingly, a slice may refer to a group of independently decodable macroblocks, and depending on the system, it may or may not include header information. A macroblock is a group of associated pixels, for example, a 16×16 pixel region in the luminance channel and the corresponding chroma channel pixel collections based on the adopted chroma subsampling pattern. Each macroblock can be further divided into sub-macroblock partitions—16×8, 8×16, 8×8, 4×8, 8×4, 4×4. The 4×4 sub-macroblock is referred to herein as block.

FIG. 1 illustrates an example list of possible types of slices in the received multimedia data stream. The list also includes a list of pre-assigned slice type numbers each of which represents a different type of slice. It should be noted that the list is an example and may comprise more or less types of slices than shown in FIG. 1. Also, the slice types may be identified by means other than numbers.

For the purposes of this example, three types of slices are discussed. A predicted slice (P-slice) refers to a slice that may have references from other data within the same frame or references to other frames. A bidirectional or interpolated slice (B-slice) refers to a slice that may include references to data from the future as well as the past. An intra slice (I slice) is a slice that has no reference to other slices.

In addition, a presentation unit, herein referred to as an "access unit" may be coded uniformly or non-uniformly. Depending on the data source, an access unit may be a picture, a frame, a field, a slice a group of slices or other independently decodable unit. An access unit is uniformly coded when all slices within the access unit are of the same type. An access unit is potentially a non-uniform access unit if there is a possibility that slices within the access unit are of different types. The three slice types described above can be divided further into six categories after considering whether the slice in question belongs to an access unit that is coded uniformly or potentially non-uniformly.

Furthermore, a slice is referred to herein as type x if the slice type is unknown. A slice type may be considered unknown if, for example, the entire slice is erroneous or the slice header is erroneous. A slice of type x is mostly used to represent a slice in a non-uniform access unit because, if the access unit is uniformly coded, a slice of a type x will be assigned a slice type of 5, 6, or 7, depending on the coding type of the access unit to which the slice belongs. These different types of slices will be used throughout the discussion of a method of error concealment.

Figure 2:
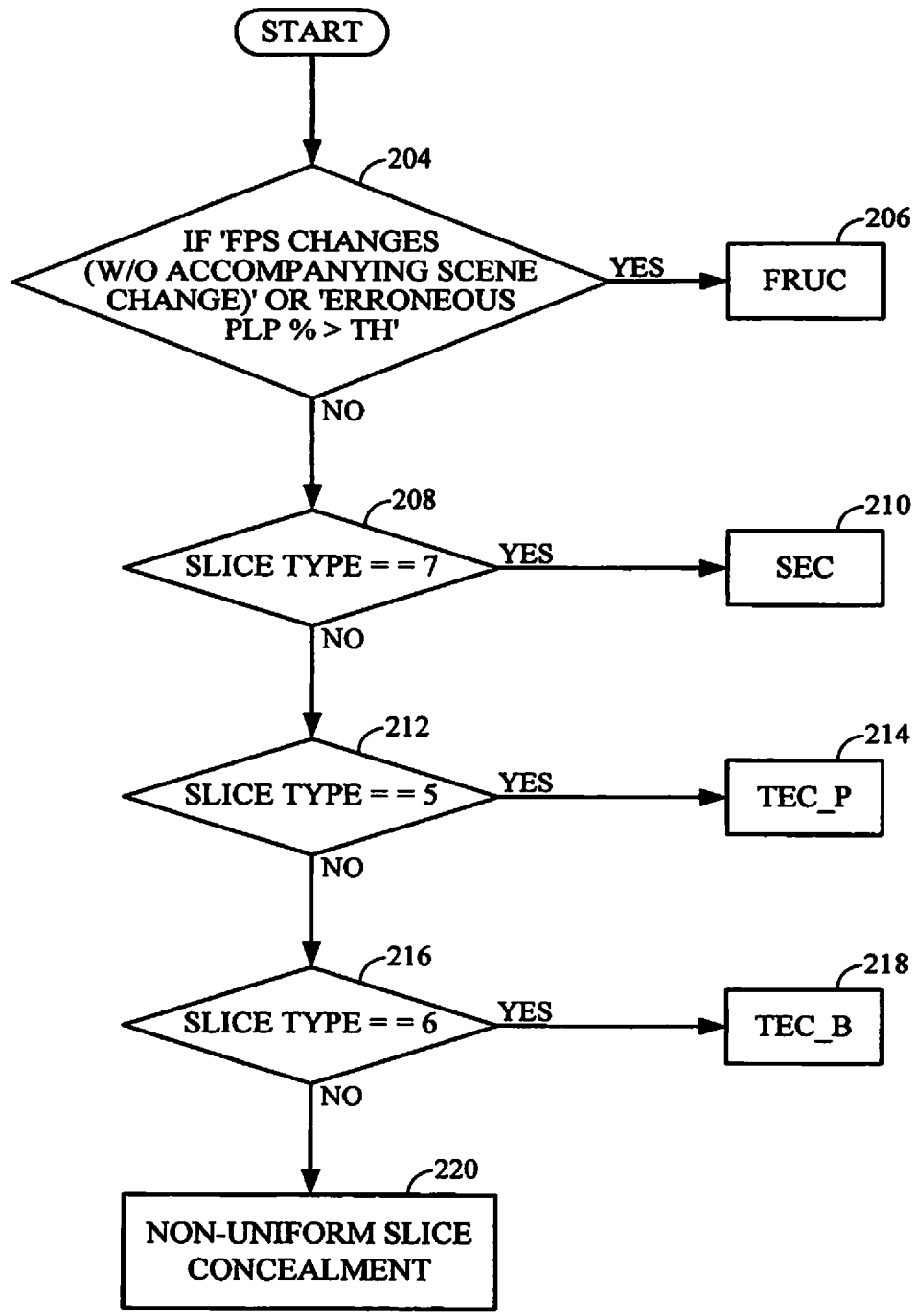
FIG. 2 is a flowchart illustrating an example method of error concealment.

FIG. 2 is a flowchart illustrating one example of a method of error concealment. In this example, a method is described which selects from a plurality of error concealment schemes the one that is better suited for the particular concealment task and then applies the same.

The selection operation may be based on error distribution information of the incoming multimedia bitstream. The incoming multimedia bitstream may comprise the error distribution information. For example, the error distribution information may be processed by the decoder in prior processes and re-inserted potentially in different form into the bitstream to assist the error concealment operation. In certain embodiments, the error distribution information is generated from multiple layer protocols, which the decoder is configured to perform.

Alternatively, the incoming multimedia bitstream may not comprise error distribution information. In such instances, the method of error concealment described herein may further comprise obtaining error distribution information of the multimedia bitstream. Also in some instances, the method of error concealment may further comprise error detection provisions based on syntax and semantic checks, dynamic-range checks on the elements of the incoming multimedia bitstream.

For example, obtaining error distribution information may comprise generating a macroblock-type and slice-type map which keeps track of macroblock types and slice-types of the current frame under processing. In another example, obtaining error distribution information may comprise generating a map including locations of correctly decoded and erroneous macroblocks for the current frame under processing. When an erroneous macroblock is detected, the macroblocks from the erroneous macroblock to the next resynchronization point in the incoming multimedia bitstream may be marked as erroneous macroblocks.

The error concealment schemes used in the example method of FIG. 2 may be classified as spatial error concealment (SEC), temporal error concealment (TEC), or Frame Rate Up Conversion (FRUC). FRUC is a motion compensated interpolation technique which uses motion information from already decoded healthy temporal neighboring reference frames and constructs an interpolated frame to conceal erroneous frame. FRUC may be applied when a whole frame is erroneous (either the frame header is corrupted beyond recovery, or all of the frame payload bitstream is lost), or erroneous region within a frame is beyond a predetermined threshold. Under these circumstances, there is no useful spatial correlation: no spatially correlated data or the correlated data is too little and the spatial correlation is not reliable for error concealment purpose over most of the erroneous area. Accordingly, temporal correlation may be more reliable. FRUC is chosen for these cases because it may utilize the frame-level temporal correlation.

Spatial error concealment (SEC) uses information (for example, luminance, color and directivity) from healthy spatial neighbors in the same frame to conceal intra, predicted and interpolated slices. SEC may be applied when the erroneous slice or macroblock is in a scene change (or shot boundary) frame or an instantaneous decoding refresh (IDR) frame, because spatial correlation is the most reliable and the best suited in these cases. SEC is also applied if a new object or a segment with new content is detected within the frame and the erroneous macroblock or slice is inside or overlaps with the new object or segment with new content, even in a P-frame or B-frame. SEC may be applied if there is no new object or content, but due to complex local or global motion, such as rotational motion, deformation of objects, non-rigid bodies, zoom-in and zoom-out, translational motion compensated prediction is failing. A decoder may determine that an erroneous macroblock or slice is inside or overlapping a new object or a segment with new content when the erroneous macroblock's neighbors are all I-type macroblocks in an otherwise inter-coded slice (P-slice or B-slice) or an inter-frame (P-frame or B-frame).

Temporal error concealment (TEC) uses motion information from healthy spatial neighbors in the same frame and already decoded neighboring reference frames to conceal an erroneous macroblock. TEC may be further partitioned into TEC for P-frame (TEC_P) and TEC for B-frame (TEC_B).

For erroneous macroblocks in inter-frames (P-frames and B-frames) or in non-scene change, non-IDR I-frames, there are both temporal and spatial correlation available for error concealment purposes. TEC_P, TEC-B or SEC may be dynamically selected as the concealment tool depending on domination factor of neighboring temporal correlation and spatial correlation. For example, for a non-scene change I-frame, its temporal correlation may be derived from its previous P-frame's or B-frame's motion fields. If the derived temporal correlation is considered to be more reliable than the spatial correlation of the available healthy neighboring I-macroblocks within the I-frame or if the extent of erroneous data is more than a threshold leading to very weak spatial correlations across most of the lost area, TEC_P is selected over SEC as the concealment tool. The temporal correlation is considered more reliable than the spatial correlation if, for example, the previous P-reference frame is correctly decoded, and the motion field between the P-frame and current I-frame is smooth.

Thus, a selection criterion of the error concealment scheme is described in the example method of FIG. 2. The method starts at a block 204, where the decoder determines whether the current frame rate, measured by frame per second (FPS), changes without an accompanying scene change or whether the erroneous physical layer packet (PLP) rate is over a threshold (TH) value. Such information may be available from the incoming multimedia bitstream, for example, from error distribution information embedded therein. The current frame rate changes without accompanying scene change when the frame rate change is introduced for bandwidth control when the content is amenable to satisfactory rendering at a lower frame rate. In that case, FRUC is applied. Therefore, if FPS changes without an accompanying scene change or the erroneous PLP rate is over TH, FRUC is selected 206 and applied to the erroneous macroblock or the erroneous slice. FRUC may be selected 206 even though the current frame rate does not change, if a frame gap is detected, e.g., a whole frame is lost.

Otherwise, the decoder checks 208 whether the type of the current slice, i.e., the slice to which the erroneous macroblock belongs, is type 7. As illustrated in FIG. 1, a slice type 7 represents an I-slice in a uniform access unit, which may be a slice in a scene change frame. If the slice is an I-slice in a uniform access unit, SEC is selected 210 and applied to the erroneous macroblock or the erroneous slice.

Otherwise, the decoder checks 212 whether the type of the current slice is type 5. As illustrated in FIG. 1, a slice type 5 represents a P-slice in a uniform access unit. If the slice is a P-slice in a uniform access unit, TEC-P is selected 214 and applied to the erroneous macroblock or the erroneous slice.

Otherwise, the decoder checks 216 whether the type of the current slice is of type 6. As illustrated in FIG. 1, a slice type number 6 represents a B-slice in a uniform access unit. If the slice is a B-slice in a uniform access unit, TEC-B is selected 218 and applied to the erroneous macroblock or the erroneous slice.

Otherwise, the decoder performs error concealment for slices in non-uniformly coded video access units. The detail of error concealment for non-uniformly coded video access units will be described in further detail in FIG. 3.

It should be noted that any one of the blocks illustrated in this flowchart may be omitted, rearranged in order, or combined with one or more other blocks. For example, the decoder may simultaneously check and determine the type of the current slice. The decoder may also check whether the current slice is of type 5 before type 7, for example.

Figure 3:
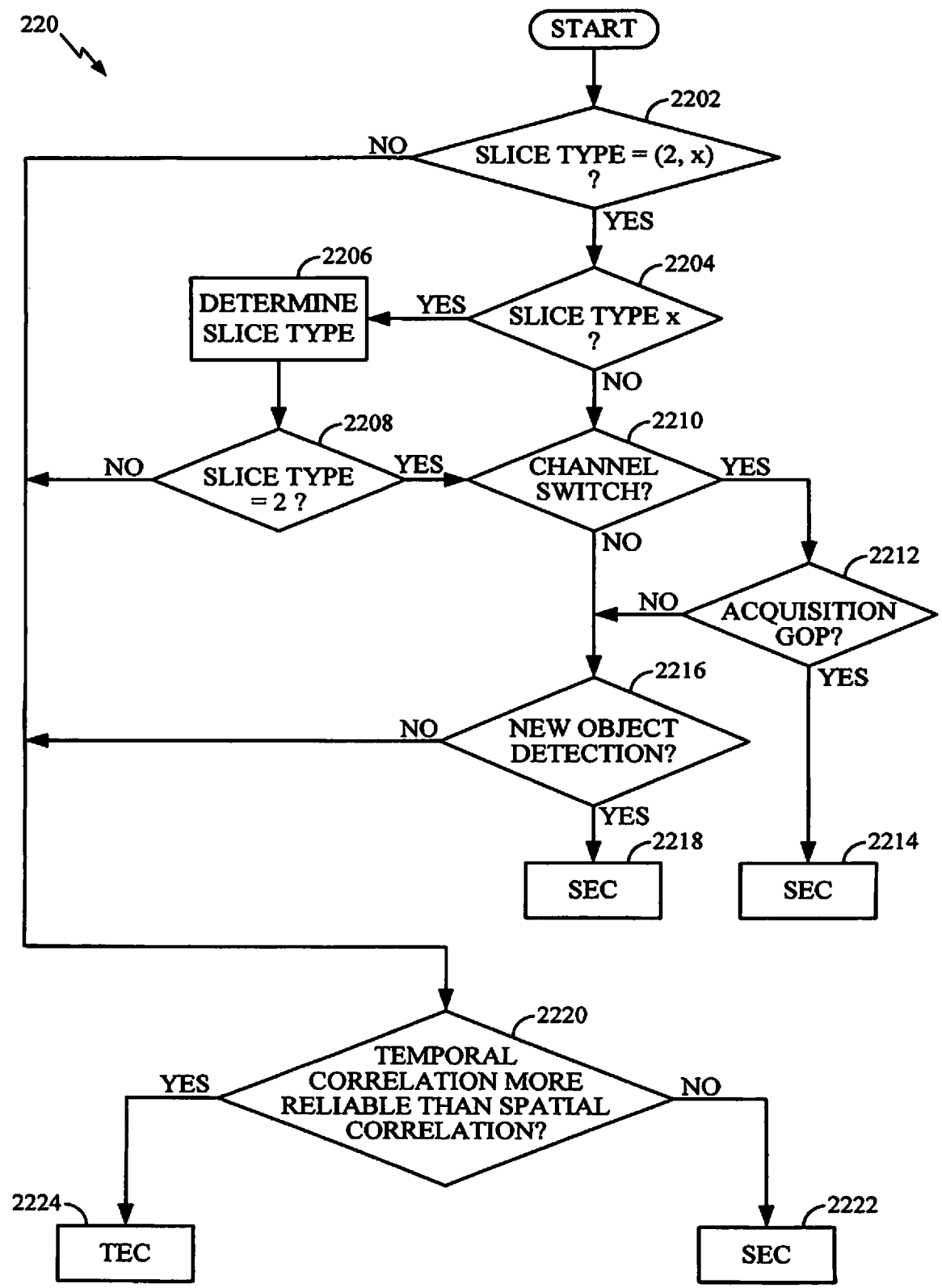
FIG. 3 is a flowchart illustrating an example method for non-uniform type error concealment.

FIG. 3 is a flowchart illustrating an example error concealment method for non-uniformly coded video access units that may be used in block 220 of FIG. 2. The method starts at a block 2202, where the decoder checks whether the type of the current slice, the slice to which the erroneous macroblock belongs, is either 2 (I-slice in a potentially non-uniform access unit) or x (unknown type of slice in a potentially non-uniform access unit). If the slice is neither an I-slice or unknown type of slice in a potentially non-uniform access unit, the method moves to a block 2220, which will be described later.

Otherwise, the decoder checks 2204 whether the type of the current slice is x. If the slice is of type x, the decoder determines 2206 the slice type of the current slice. The slice type decision is based on the available spatially and/or temporally neighboring slice types, including co-located slices from temporally neighboring frames, both causal and non-causal. If both top and bottom spatially neighboring slices exist and both are of type 2 (I-slice in a potentially non-uniformly coded access unit) or if only one of these spatially neighboring slices exists and it is of type 2, then the current slice is assigned type 2. If both top and bottom spatially neighboring slices exist and only one of these slices is of type 2, or if only one of these spatially neighboring slices exists and it is not of type 2, then the current slice's type determination is made based on further information.

In one embodiment further information comprises the structure and values of the motion vector field of the current video access unit and the temporally neighboring access units' slice types and motion vector fields. In one embodiment based on this information a decoder may infer global uniform motion such as a scroll or pan and assign a slice type of 2 to the current slice.

If both neighboring slices exist and both are of type 0, the current slice is assigned type 0 (P-slice in a potentially non-uniformly coded access unit), otherwise, the current slice is assigned type 1 (B-slice in a potentially non-uniformly coded access unit).

If the decoder checks 2208 and determines that the type of the current slice is not 2, the method moves to block 2220, which will be described later.

If the type of the current slice is 2 or x, the decoder determines 2210 whether there is a channel switch event in effect at the current frame, i.e., the frame to which the erroneous macroblock belongs is the first or among the first few frames acquired from a newly tuned-to channel. A channel switch is triggered when, for example, a user chooses to switch a channel. The decoder may determine whether there is a channel switch in effect by, for example, checking the incoming multimedia bitstream to see whether a channel switch flag is set. Alternatively, the decoder may receive a 'channel switch in effect' signal in response to a user's selection.

If there is a channel switch, the decoder determines 2212 whether the current frame belongs to a series of frames, called an acquisition group of pictures (or acquisition GOP). The acquisition GOP comprises temporally predicted frames (P-frames and B-frames), each of which may further comprise Intra-coded regions. The intra-coded regions within the acquisition GOP may be accumulated and combined to form an entire I-frame. The acquisition GOP may be used as a random access point to a multimedia bitstream. The decoder may determine whether the current frame belongs to acquisition GOP by, for example, checking the incoming multimedia bitstream to see whether an acquisition GOP flag is set. If the current frame belongs to an acquisition GOP, SEC is selected 2214 and applied to the erroneous macroblock or the erroneous slice.

If there is no channel switch or if the current frame does not belong to an acquisition GOP, the decoder determines 2216 whether a new object or new content is detected within the current slice. The current macroblock may be located within or overlapping a new object or new content if a new object or new content is detected within the current slice. In that case, SEC may be selected. The decoder determines whether a new object or new content is present within the current slice by looking at the slice type of the neighboring slices as well as the neighboring macroblock types within neighboring slices. If both top and bottom neighboring slices are I-slices, a new object or new content is declared within the current slice. If one or none of the top and bottom neighboring slices is an I-slice, a new object or new content is not declared within the current slice. In other embodiments, if one of the top or bottom neighboring slices is an I-slice, the determination of whether a new object or new content is to be declared may be based on additional information such as an analysis of motion vector fields of the current and neighboring frames as well as slice and macroblock coding types. If a new object or new content is detected, SEC is selected 2218 and applied to the erroneous macroblock or the erroneous slice.

Otherwise, if the slice type is not 2 or x, or if no new object or new object is detected, there is both temporal and spatial correlation available for possible use in the concealment of the erroneous macroblock or the erroneous slice. In that case, the decoder determines 2220 whether the correlation of temporal neighbors is more reliable than the spatial correlation based on error distribution information embedded in the multimedia bitstream. If the temporal correlation is more reliable, TEC is selected 2224 and applied to the erroneous macroblock or the erroneous slice. Otherwise, SEC is selected 2222 and applied to the erroneous macroblock or the erroneous slice.

It should be noted that any one of the blocks illustrated in this flowchart may be omitted, rearranged in order, or combined with one or more other blocks.

Figure 4:
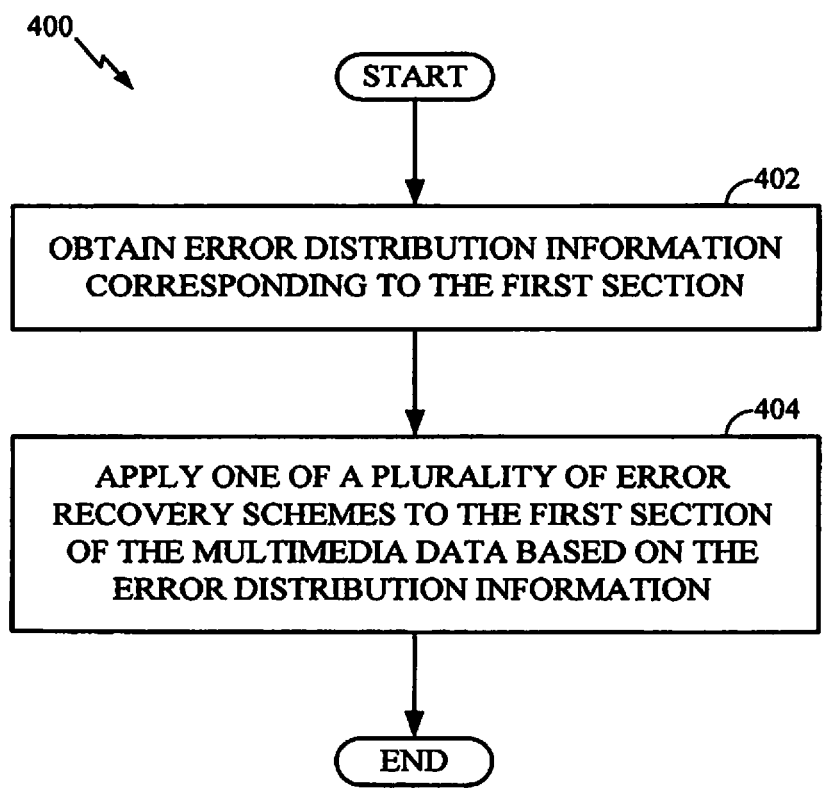
FIG. 4 is a flowchart illustrating an example method of processing multimedia data stream comprising a first section received in error.

FIG. 4 is a flowchart illustrating another example of a method of processing multimedia data comprising a first section received with errors. The method begins at a block 402, where error distribution information corresponding to the first section is obtained. Next at a block 404, one of a plurality of error recovery schemes is applied to the first section of the multimedia data based on the error distribution information. Applying 404 may comprise selecting one of the plurality of error recovery schemes that is better suited for a particular concealment task and then processing the erroneous section accordingly. The acts of these blocks are similar to the discussion above in FIGS. 2-3.

Figure 5:
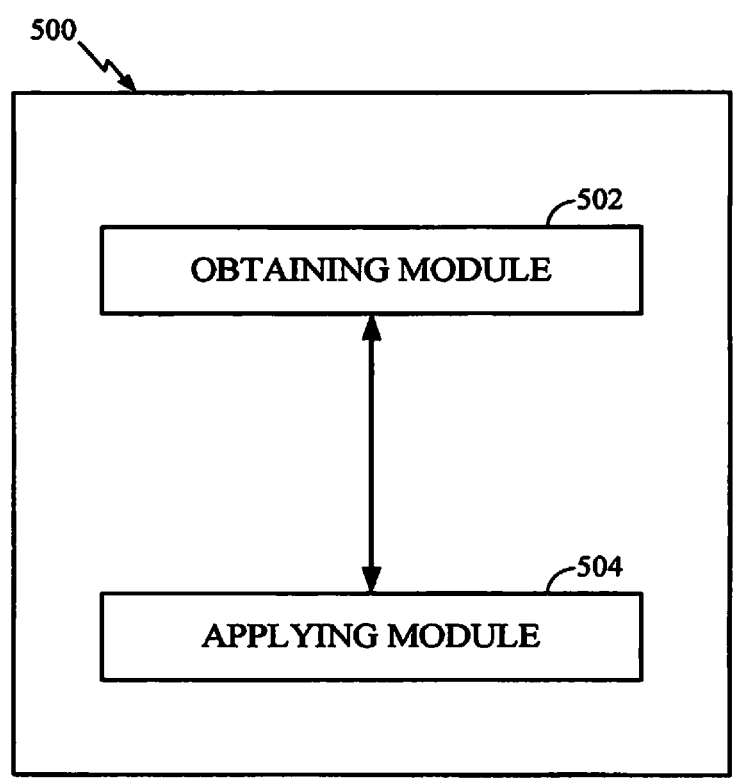
FIG. 5 shows a block diagram illustrating an example decoder configured to process multimedia data stream comprising a first section received in error.

FIG. 5 shows a block diagram illustrating an example of a decoder configured to process multimedia data comprising a first section received with errors. The decoder comprises an obtaining (or error detection) module 502 and an applying (or error handling) module 504. The obtaining module 502 is configured to obtain error distribution information corresponding to the received first section. The applying module 504 is configured to apply one of a plurality of error recovery schemes to the received first section of the multimedia data based on the error distribution information. The applying module 504 may also select a particular concealment scheme and process the received erroneous section accordingly.

Figure 6:
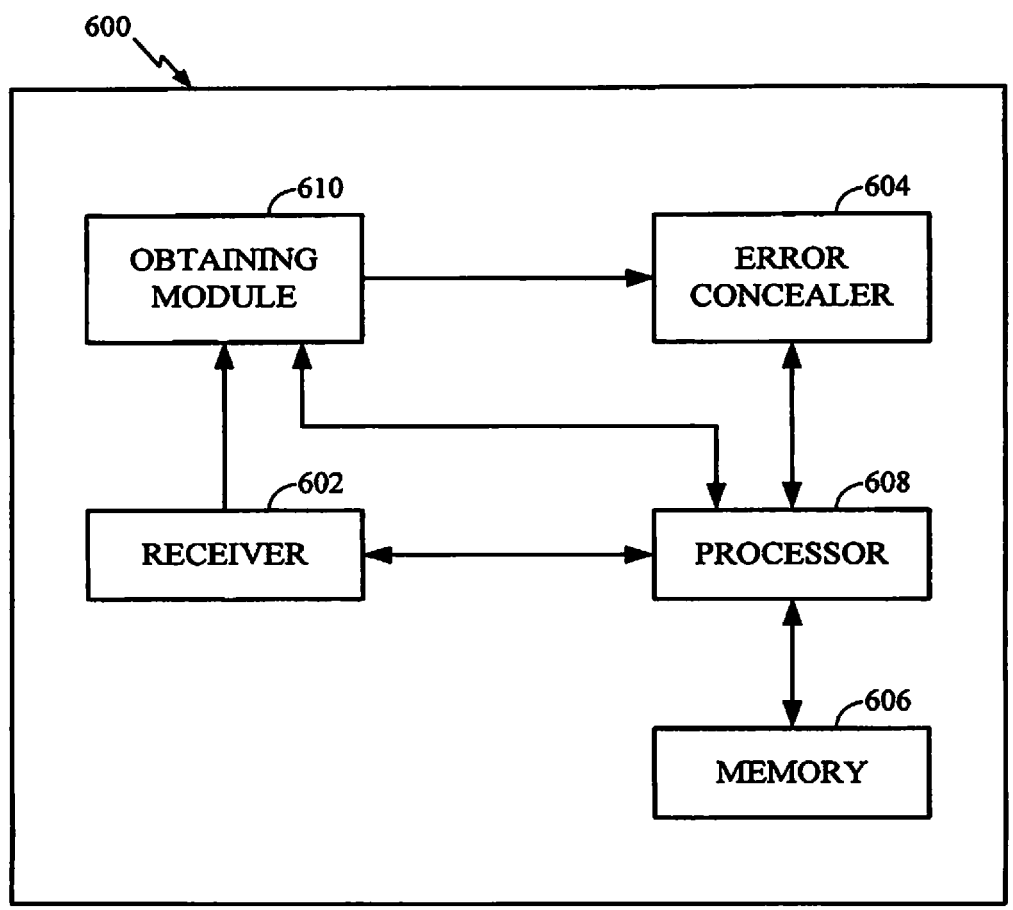
FIG. 6 shows a block diagram illustrating an example of a decoder configured to decode an incoming multimedia data stream.

FIG. 6 shows a block diagram illustrating an example of a decoder configured to decode an incoming multimedia data stream (not shown). The decoder device 600 may comprise a receiver 602 and an error concealer 604. It should be noted that the decoder device 600 is an example and may comprise additional elements such as a storage medium 606 and a processor 608.

The storage medium 606 may be a memory including one or more of solid state or disk based storage. The processor 608 may include one or more of a general purpose processor or a digital signal processor. The processor 608 may be any suitable general purpose single- or multi-chip microprocessor, or any suitable special purpose microprocessor such as a digital signal processor, microcontroller, or a programmable gate array. The processor 608 is configured to execute one or more software applications to control the operation of other components of the decoder 600. The processor 608 is also configured to access the memory 606 to read and save data.

The receiver 602 is configured to receive the multimedia data. The multimedia data may have a section in error. Accordingly, the receiver 602 may receive a multimedia data having a first section in error. The error concealer 604 is configured to apply one of a plurality of error recovery schemes to the first section of the multimedia data based on an error distribution information corresponding to the first section.

The decoder device 600 may optionally comprise an obtaining module 10 configured to obtain the error distribution information corresponding to the first section. Alternatively, the error concealer 604 may be further configured to obtain the error distribution information corresponding to the first section.

The error concealer 604 may apply one of the plurality of error recovery schemes based at least on whether a first access unit comprising the first section is uniformly coded, based at least on whether a channel switch is detected, based at least on whether a new object is detected, and/or based at least on whether the first section comprises a uniformly coded slice or a non-uniformly coded slice. The error concealer 604 may apply frame rate up conversion for the first section if the ratio of erroneous data over all data within the access unit comprising the first section is over a predetermined threshold value. The error concealer 604 may apply spatial error concealment for the first section if the first section is inside a new object. The error concealer 604 may apply temporal error concealment for the first section if the access unit comprising the first section is an I-frame and if the I-frame is not a scene-change frame.

Moreover, in some embodiments, an error concealer may comprise a selecting module 705 and a processing module 710 as shown in FIG. 7. The selecting module is configured to select one of a plurality of error recovery schemes based on the error distribution information for the first section and the processing module 614 configured to process the first section based on the selected error recovery scheme. As discussed above, the plurality of error recovery schemes may comprise one or a combination of spatial error concealment, frame rate up conversion, temporal error concealment for P-frame, and temporal error concealment for B-frame.

If a selecting module 612 is implemented, the selecting module 612 may be configured to select one of the plurality of error recovery schemes based at least on whether a first access unit comprising the first section is uniformly coded, whether a channel switch is detected, whether a new object is detected, and/or whether the first section comprises a uniformly coded slice or a non-uniformly coded slice. Similarly, the selecting module 612 may be configured to select frame rate up conversion for the first section if the ratio of erroneous data over all data within the access unit comprising the first section is over a predetermined threshold value, spatial error concealment for the first section if the first section is inside a new object, temporal error concealment for the first section if the access unit comprising the first section is an I-frame and if the I-frame is not a scene-change frame.

Accordingly, the error concealer 604 is configured to perform error concealment of the incoming multimedia data. The error concealer 604 may be configured to perform error concealment based on methods of selecting the appropriate error concealment schemes as described above with regard to FIGS. 2-4. In some embodiments, a portion or all of the function of the error concealer 604 may be performed by the processor 608.

It should be noted that any one of the functional blocks as illustrated in FIG. 6 may be rearranged, removed, or combined with one or more other blocks without changing the function of the decoder. For example, the error concealer 604 may be combined with the processor 608.

In some embodiments, an apparatus for processing multimedia data comprising a first section received with errors is provided. The apparatus comprises means for obtaining error distribution information corresponding to the first section and means for applying one of a plurality of error recovery schemes to the first section of the multimedia data based on the error distribution information. The means for obtaining error distribution information may comprise an obtaining module 502. The means for applying error recovery techniques may comprise an applying module 504. In one example, the applying means may further comprise means for selecting one of a plurality of error recovery schemes based on the error distribution information for the first section and means for processing the first section based on the selected error recovery scheme. The means for selecting one of a plurality of error recovery schemes based on the error distribution information for the first section and the means for processing the first section based on the selected error recovery scheme may comprise the applying module 504.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples.

What is claimed is:

1. A method of processing multimedia data comprising a first section received in error, the method comprising:
    obtaining error distribution information corresponding to the first section;
    selecting one of a plurality of error recovery schemes based on the error distribution information for the first section, wherein the selecting is based at least on whether a channel switch is detected; and
    processing the first section based on the selected error recovery scheme.

2. The method of claim 1, wherein the multimedia data comprises a plurality of frames, each frame comprising a plurality of sections, and wherein the obtaining comprises generating a map comprising locations of correctly decoded and erroneous sections.

3. The method of claim 1, wherein the plurality of error recovery schemes comprise spatial error concealment, frame rate up conversion, temporal error concealment for P-frame, and temporal error concealment for B-frame.

4. The method of claim 1, wherein the multimedia data comprises information generated from multiple layer protocols.

5. An apparatus for processing multimedia data comprising a first section received in error, comprising:
    means for obtaining error distribution information corresponding to the first section;
    means for selecting one of a plurality of error recovery schemes based on the error distribution information for the first section, wherein the selecting is based at least on whether a channel switch is detected; and
    means for processing the first section based on the selected error recovery scheme.

6. The apparatus of claim 5 wherein the multimedia data comprises a plurality of frames, each frame comprising a plurality of sections, and wherein the obtaining means comprises means for generating a map comprising locations of correctly decoded and erroneous sections.

7. The apparatus of claim 5, wherein the plurality of error recovery schemes comprise spatial error concealment, frame rate up conversion, temporal error concealment for P-frame, and temporal error concealment for B-frame.

8. The apparatus of claim 5, wherein the multimedia data comprises information generated from multiple layer protocols.

9. A processor configured to perform a method, the method comprising:
    obtaining error distribution information corresponding to a first section of multimedia data received in error;
    selecting one of a plurality of error recovery schemes based on the error distribution information for the first section, wherein the selecting is based at least on whether a channel switch is detected; and
    processing the first section based on the selected error recovery scheme.

10. The processor of claim 9, wherein the multimedia data comprises a plurality of frames, each frame comprising a plurality of sections, and wherein the obtaining comprises generating a map comprising locations of correctly decoded and erroneous sections.

11. The processor of claim 9, wherein the plurality of error recovery schemes comprise spatial error concealment, frame rate up conversion, temporal error concealment for P-frame, and temporal error concealment for B-frame.

12. The processor of claim 9, wherein the multimedia data comprises information generated from multiple layer protocols.

13. A computer-readable medium embodying means for causing a computer to execute a method, the method comprising:
   obtaining error distribution information corresponding to a first section of multimedia data received in error;
   selecting one of a plurality of error recovery schemes based on the error distribution information for the first section, wherein the selecting is based at least on whether a channel switch is detected; and
   processing the first section based on the selected error recovery scheme.

14. The computer-readable medium of claim 13, wherein the multimedia data comprises a plurality of frames, each frame comprising a plurality of sections, and wherein the obtaining comprises generating a map comprising locations of correctly decoded and erroneous sections.

15. The computer-readable medium of claim 13, wherein the plurality of error recovery schemes comprise spatial error concealment, frame rate up conversion, temporal error concealment for P-frame, and temporal error concealment for B-frame.

16. The computer-readable medium of claim 13, wherein the multimedia data comprises information generated from multiple layer protocols.

17. An apparatus for processing multimedia data comprising:
   a receiver configured to receive the multimedia data having a first section received in error; and
   an error concealer comprising:
   a selecting module configured to select one of a plurality of error recovery schemes based on the error distribution information for the first section, wherein the error concealer is configured to apply one of the plurality of error recovery schemes based at least on whether a channel switch is detected; and
   a processing module configured to process the first section based on the selected error recovery scheme.

18. The apparatus of claim 17, further comprising an obtaining module configured to obtain the error distribution information corresponding to the first section.

19. The apparatus of claim 17, wherein the error concealer is further configured to obtain the error distribution information corresponding to the first section.

20. The apparatus of claim 17, wherein the multimedia data comprises information generated from multiple layer protocols.

* * * * *